US008285768B2

(12) United States Patent
Fenney

(10) Patent No.: US 8,285,768 B2
(45) Date of Patent: Oct. 9, 2012

(54) APPARATUS FOR EVALUATING A MATHEMATICAL FUNCTION

(75) Inventor: Simon Fenney, St. Albans (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 1803 days.

(21) Appl. No.: 11/140,258

(22) Filed: May 27, 2005

(65) Prior Publication Data

US 2005/0283516 A1 Dec. 22, 2005

(30) Foreign Application Priority Data

May 27, 2004 (GB) .................................. 0411880.8

(51) Int. Cl.
*G06F 1/02* (2006.01)
(52) U.S. Cl. ........................................................ 708/270
(58) Field of Classification Search .................. 708/270, 708/271
See application file for complete search history.

(56) References Cited

U.S. PATENT DOCUMENTS

| 5,068,816 A * | 11/1991 | Noetzel .......................... 708/270 |
| 5,305,248 A | 4/1994 | Ammann |
| 5,951,625 A * | 9/1999 | Duvanenko et al. ........... 708/290 |
| 6,330,000 B1 | 12/2001 | Fenney et al. |
| 7,366,745 B1 * | 4/2008 | Oberman et al. .............. 708/270 |
| 2003/0037080 A1 * | 2/2003 | Clifton ............................ 708/270 |
| 2003/0200066 A1 * | 10/2003 | Stewart et al. ..................... 703/2 |

FOREIGN PATENT DOCUMENTS

| EP | 0 421 092 A3 | 4/1991 |
| EP | 0 577 130 A3 | 1/1994 |

OTHER PUBLICATIONS

Search Report dated Aug. 10, 2005 in Great Britain Application No. 0510958.2 (4 pages).
Turkowski, K., "Computing the Inverse Square Root", *Graphics Gems V*, Academic Press, 1995, pp. 16-21.
Detrey, J. and de Dinechin, F., "Table-based polynomials for fast hardware function evaluation", *Laboratoire de l'Informatique du Parallelisme*, Research Report No. RR2004-52, Ecole Normale Supérieure de Lyon, Nov. 2004 (13 pages).
Walters, E.G. and Schulte, M.J., "Efficient Function Approximation Using Truncated Multipliers and Squarers", date unknown (8 pages).
Watt and Watt, "B-splines", *Advanced Animation and Rendering Techniques*, date unknown, pp. 89-91.
Sweldens, W. and Schroeder, P., "Building Your Own Wavelets at Home", date unknown, 74 pages.

* cited by examiner

*Primary Examiner* — Chuong D Ngo
(74) *Attorney, Agent, or Firm* — Flynn, Thiel, Boutell & Tanis, P.C.

(57) ABSTRACT

An apparatus for evaluating a mathematical function at an input value is provided. The apparatus includes a device for selecting a mathematical function, a device for inputting a value at which to evaluate the function, a device for identifying an interval containing the input value, the interval being described by at least one polynomial function, a device for retrieving at least one control point representing the polynomial function from at least one look up table, a device for deriving the polynomial function from the control points, a device for evaluating the function for the input value and a device for providing data representing the evaluated function at an output.

8 Claims, 5 Drawing Sheets

APPARATUS FOR EVALUATING A MATHEMATICAL FUNCTION

BACKGROUND OF THE INVENTION

In floating point units of some CPUs or, more particularly, contemporary graphics chips, it is necessary to compute mathematical functions of certain floating point numbers. These are typically continuous and may include functions such as 'reciprocal', i.e. $f(x)=1/x$, 'reciprocal square root', $f(x)=1/\sqrt{x}$, 'logarithm base 2', $f(x)=\ln x/\ln 2$, power base 2, $f(x)=2^x$, sine and cosine. For example, such mathematical functions form part of the instruction set of the Microsoft Direct X graphics specification, and some have appeared, in various forms, as instructions in various CPUs.

With many of these functions, there is a repeating pattern of behaviour that can be exploited to simplify the implementation—cosine and sine are obvious examples, but, this behaviour can also be seen with reciprocal which 'repeats' for each for every interval of the form $[2^n, 2^{n+1})$ and for 'reciprocal square root' which repeats on intervals of the form $[2^n, 2^{n+2})$. Such regions can usually be extracted through simple integer manipulation of the input floating point exponent, and so the difficult part of the evaluation reduces to evaluating a function on a much-reduced range of numbers. Without loss of generality, it can be assumed that the input value to such a reduced function can be mapped to a (typically fixed point) value, x' in the range [0, 1]. The output is also assumed to be of the same form.

There are several methods of computing such reduced functions known in the art. The simplest system is that of a direct table look-up. For a given input precision (N bits) and a particular output precision (M bits) the table would contain $2^N$ entries each of M-bits. The input value is mapped to the nearest entry in the table and the result is obtained. However, for anything except small tables, this is an expensive and generally inaccurate option.

One approach that can be used to alleviate the expense is to compress the data in the table—such a scheme was used for reciprocal calculations in U.S. Pat. No. 6,330,000. This scheme, however, is difficult to apply generally and, furthermore, does not offer large levels of compression.

An alternative approach is to use a small look-up table, which only gives moderately precise results, and then apply Newton-Raphson iteration to improve the numerical accuracy. With such a scheme, the precision, in terms of numbers of bits, typically doubles with each such iteration. Turkowski describes such a method in 'Graphics Gems V' [ISBN 0-12-543455-3] for computing the reciprocal square root. A look-up table with, say, $2^6$ entries, produces an initial guess, $R_0$, which is then improved by use of two Newton-Raphson iteration steps that evaluate:

$$R_{i+1}=(3-R_i*R_i*x)*x/2$$

Similarly, the Texas Instrument's 'TMS320C3x User's Guide' gives examples for the computation of 'reciprocal' and 'reciprocal square root'. It, in fact, effectively dispenses with the look-up table and starts with a very approximate initial guess and simply relies on the iteration to improve the accuracy.

One problem with methods that use iterative improvements such as Newton-Raphson is that they require the additional mathematical operations (either floating point or integer) in order to converge to the result. This may not be an issue when the iterations steps are performed in a CPU with multipliers or adders that may otherwise be idle, but including the extra circuits in a dedicated hardware unit may be expensive.

Another alternative is to use a power series to evaluate the function, say, using three or four terms. In this approach, weighted versions of the k derivatives are stored as constants and the function is evaluated as . . .

$$f(x+x')=C_0+C_1 x'+C_2 x'^2+\ldots+C_k x'^k \quad \text{Eqn. 1}$$

or, equivalently, with fewer multiplies, as . . .

$$f(x+x')=C_0+(C_1+(C_2+\ldots)x')x' \quad \text{Eqn 1a}$$

Obvious candidates for such an implementation include Sine and Cosine, and, in fact, the Microsoft DirectX 9 specification does give an example using such.

One problem with only having a single function is that it may be difficult to maintain accuracy through the entire domain of the function without having a very large number of terms. A simple remedy is to again use a table approach and use a piecewise approximation to the function. This method is well known in the art and several improvements have been suggested: e.g by Detrey and de Dinechin in "*Table-based polynomials for fast hardware function evaluation*" or Walters and Schulte in "*Efficient Function Approximation Using Truncated Multipliers and Squarers*". In this method the domain of the function is broken into $2^N$ sections with a table entry for each section. Each entry, i, would store the necessary power series constants, i.e., $C_0^i, C_1^i \ldots C_k^i$ which describe the curve in that section. In practice, the approximating function would generally be linear, quadratic, or cubic. A simple example of such a quadratic scheme, with N=3, i.e. only 8 sections, is shown graphed in FIG. 1 (A). A possible look-up table for this case is shown below:

| Table Entry | $C_0$ | $C_1$ | $C_2$ |
|---|---|---|---|
| 0 | 1.0000 | −0.1242 | 0.0131 |
| 1 | 0.8889 | −0.0982 | 0.0094 |
| 2 | 0.8000 | −0.0797 | 0.0069 |
| 3 | 0.7273 | −0.0659 | 0.0053 |
| 4 | 0.6667 | −0.0554 | 0.0041 |
| 5 | 0.6154 | −0.0472 | 0.0033 |
| 6 | 0.5714 | −0.0407 | 0.0026 |
| 7 | 0.5333 | −0.0355 | 0.0022 |

Note:
In a hardware implementation, if so desired, the $C_0^i$ values could all be adjusted by 0.5 to reduce the cost of evaluation since this 'bit' is constant.

A plot of the relative error for these values is shown in FIG. 1 (B).

Given the input function value, x', x'∈[0,1), the required table entry is identified by calculating $\lfloor x'*2^N \rfloor$. In hardware or software terms, this is simply a matter of taking the top N bits of a fixed-point representation of x'. An interpolating parameter, α∈[0,1), is computed as $\alpha = x'*2^N - \lfloor x'*2^N \rfloor$. This is just a matter of extracting the remaining, least significant bits of the x' value. The function is then computed as:

$$f(x')=C_0+C_1\alpha+C_2\alpha^2$$

(or via the alternative factorisation presented above). This example would not be terribly accurate but can be improved through some combination of the following:

1. Increasing the number of table entries, i.e. increasing N.
2. Using a higher order polynomial.
3. Increasing the precision of the stored values.

The actual size of the multipliers and adders used in the above evaluation is also important and also represents a trade-off of implementation cost and accuracy.

Another advantage of this scheme is that, in a hardware solution, several different functions could share the same polynomial evaluation hardware, i.e., $f(x)=C_0+C_1\alpha+C_2\alpha^2+\ldots$ can be reused. Each particular function would, of course, still need its own look-up table and set-up and finalise units.

Although N, here, is very much smaller than that needed for the simple look-up table described earlier, it still requires a total of $k2^N$ data values. One other concern is that, because the sections are piecewise, care must be taken with the precision so that entire function is continuous, i.e., that the computed end point of one section evaluates to the matching start of the next section. It is also desirable that there not be too great a discontinuity in the derivatives across the segments.

In computer graphics, smooth surfaces and curves are frequently modelled using parametric splines or cubic Catmull-Rom. A good introduction to these systems can be found in 'Advanced Animation and Rendering Techniques' by Watt and Watt [ISBN0-201-54412-1]. Spline systems use 'control points' to control the local path of a curve or surface, which is a piecewise polynomial of some order, typically cubic. Although some splines are interpolating, i.e., the curve actually passes through the control points, in two of the more popular representation systems, Bezier and (uniform) B-Spline curves, the curve is approximating, meaning that the curve does not generally pass through the control points although it does tend to follow the positions of the control points.

In FIG. 2, a sequence of control points, (one of which is indicated by '1') has been shown (connected by lines) which, in turn, defines the path of a uniform B-Spline curve, '2'. One particularly nice property of uniform B-Splines is that it is trivial to obtain continuity in both the curve and its derivatives across the piecewise sections. Evaluation, on the other hand, of the splines may be better performed using the de Casteljau algorithm on the Bezier equivalents. (See 'Advanced Animation and Rendering Techniques'). Although, in graphics, splines are generally for 2D or 3D curves, the range can be reduced to a single dimension.

SUMMARY OF THE INVENTION

We have appreciated that storing polynomial functions in terms of their polynomial coefficients in look up tables requires a large amount of memory, particularly for high order polynomials. It would be beneficial if the same polynomial curves could be represented by fewer stored data in order to reduce the required memory.

Preferred embodiments of the invention reduce the number of data points stored to describe a polynomial curve by storing control points to define the curve and then manipulating the control points using arithmetic blocks to generate the polynomial coefficients. Embodiments of the invention provide the advantage that a single control point can be stored from which the polynomial coefficients can be generated rather than storing the multiple coefficients which define the polynomial. Thus, computational devices, graphics chips or any dedicated hardware which is required to use polynomial functions would benefit from the present invention since the reduction in memory capacity would reduce the cost of the device.

In broad terms, the invention relates to a method and apparatus for evaluating mathematical functions using a look-up table wherein the values stored in the table represent curve control points Preferred embodiments of the invention reduce the amount of data that needs to be stored in the look-up table in order to represent the polynomial curve by a significant factor and thus reduce the size of the memory required. It also preserves the continuity (including derivatives) across the boundaries between the piecewise sections.

Preferred embodiments use a B-Spline piecewise curve, of quadratic or perhaps cubic order, to represent the function and the look-up table can be reduced in size by a factor of up to three (quadratic) or four (cubic). It achieves this by eliminating the need to store constant factors relating to the $2^{nd}$, $3^{rd}$ and higher derivatives (i.e., $C_1^i \ldots C_k^i$). Instead, only a single value, a (uniform) B-Spline control point, is stored 'per section' of the look-up table and this, along with the neighbouring control point values, is sufficient to define the piecewise curve in that particular section. The system does require K additional values, where K is the order of the approximation (i.e. quadratic implies K=2), in order to process the extremities of the curve, and so the invention requires a total of 2N+K values to be stored—a significant reduction from $K2^N$.

It should be noted that, unlike the prior art solutions where the constant terms, $C_0^i$, generally lie on the curve, the stored values in the invention generally do not.

Because several neighbouring control point values (i.e. three for quadratic representations, and four for cubic) must be accessed in parallel to evaluate a curve segment, some means of efficiently obtaining this data is required. This is achieved in the invention by replacing the single '$2^N$+K entry' look-up table with several smaller look-up tables. For the case of quadratic approximations, this consists of two, '$2^{N-2}$ entry' and two '$2^{N-2}$+1 entry' tables, wherein each table thus stores every fourth value. For cubic approximations, 3 tables would have $2^{N-2}$+1 entries.

Preferred embodiments of the invention will now be described in detail by way of example with reference to the accompanying diagrams in which:

FIGS. 1(A) and 1(B) show graphs of a function represented/approximated by eight piecewise sections.

PREFERRED EMBODIMENT

Preferred embodiments of the invention can be implemented on general purpose computers, dedicated hardware or calculators.

Figure 5:
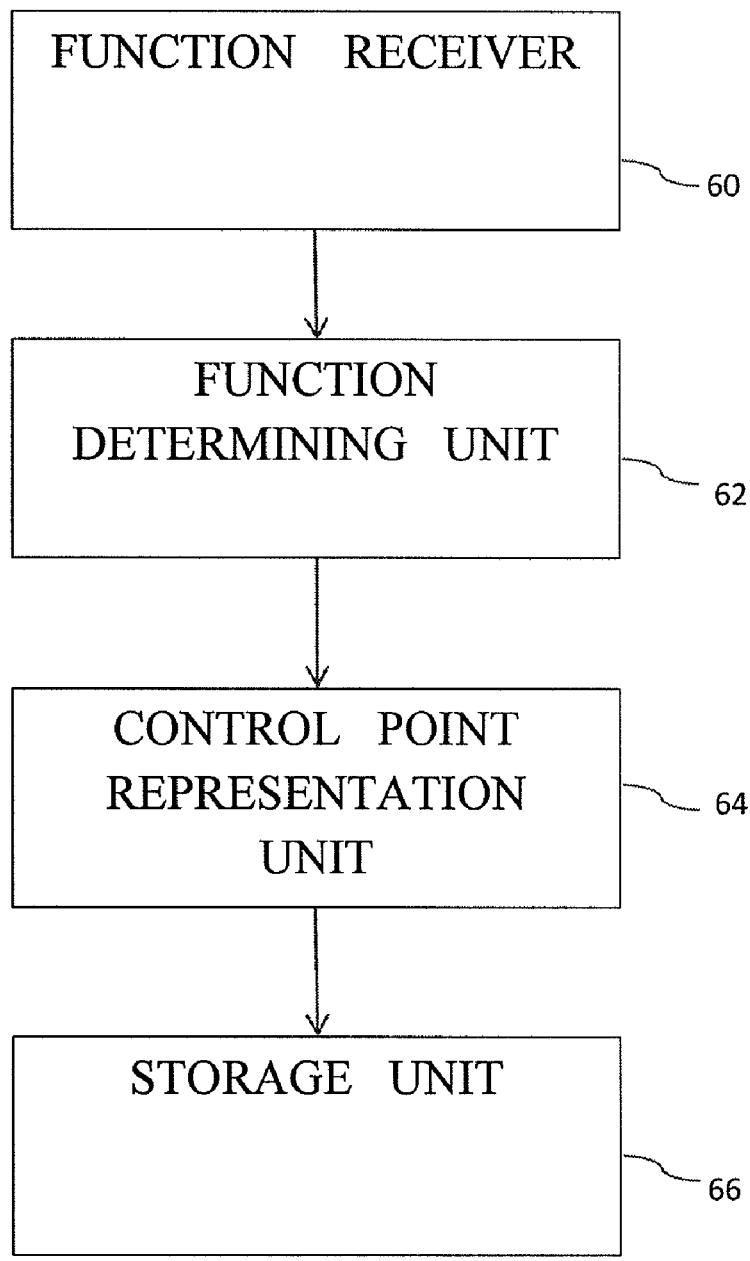
FIG. 5 shows an overview of the invention for storing data representing a mathematical function in a memory device.

FIG. 5 shows an overview of the preferred embodiment including a function receiver 60, a function determining unit 62, a control point representation unit 64 and a storage unit 66.

Figure 1:
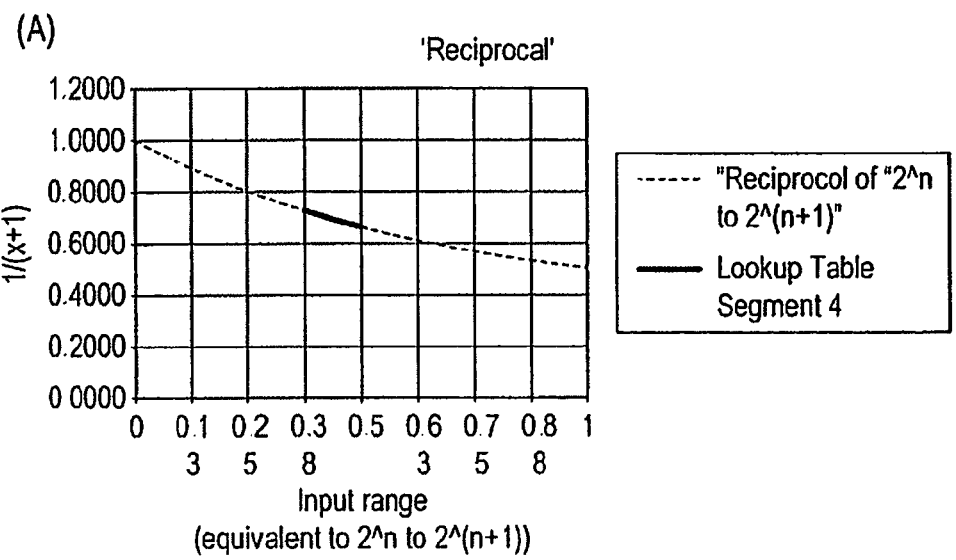
Figure 1:
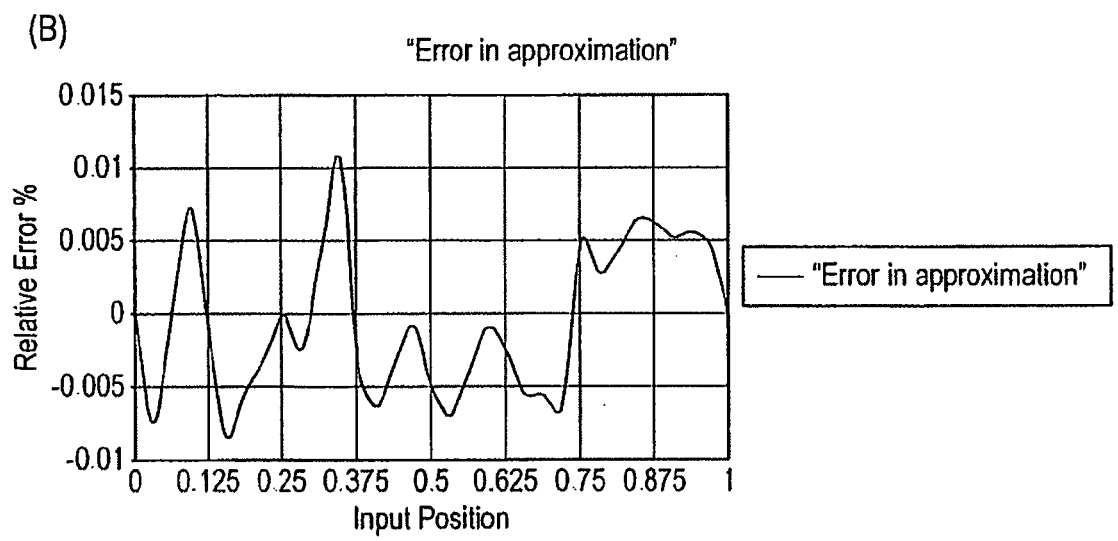
Figure 2:
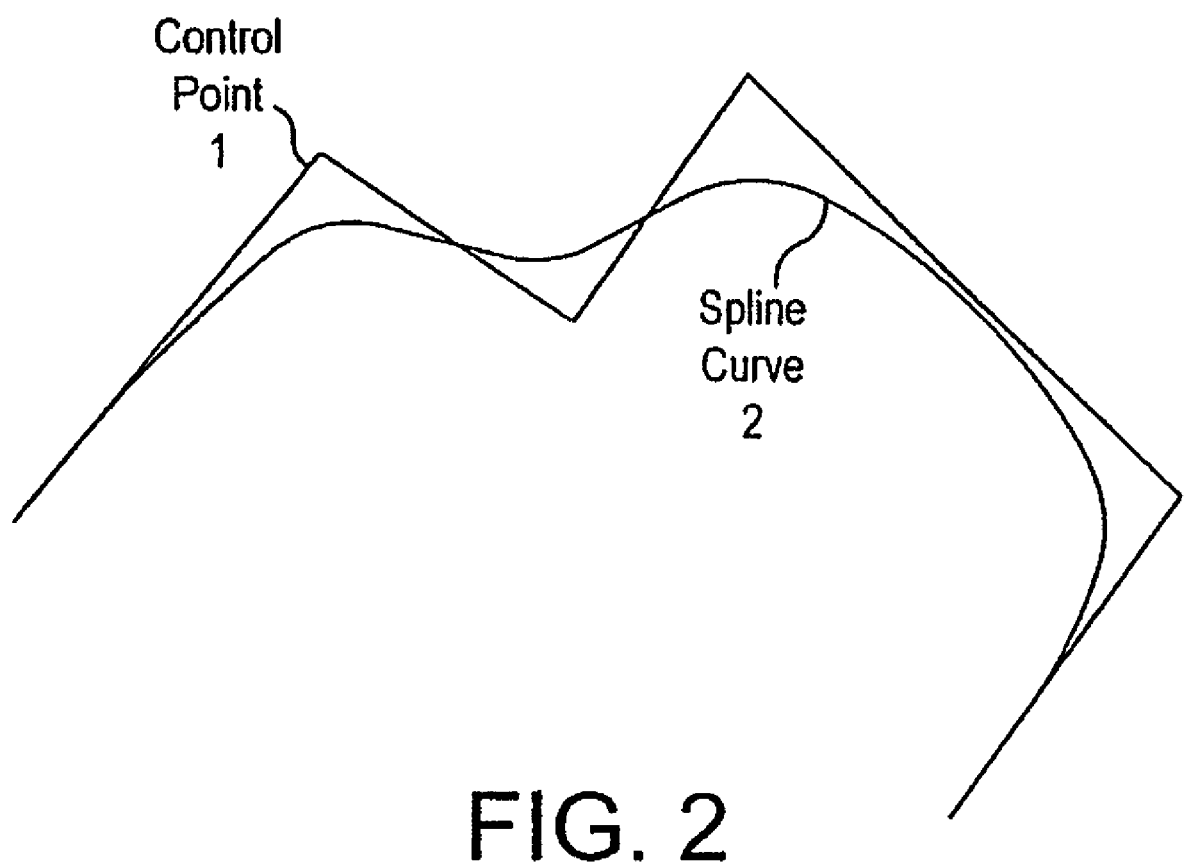
FIG. 2 shows a simple uniform B-Spline with an associated set of control points.
Figure 3:
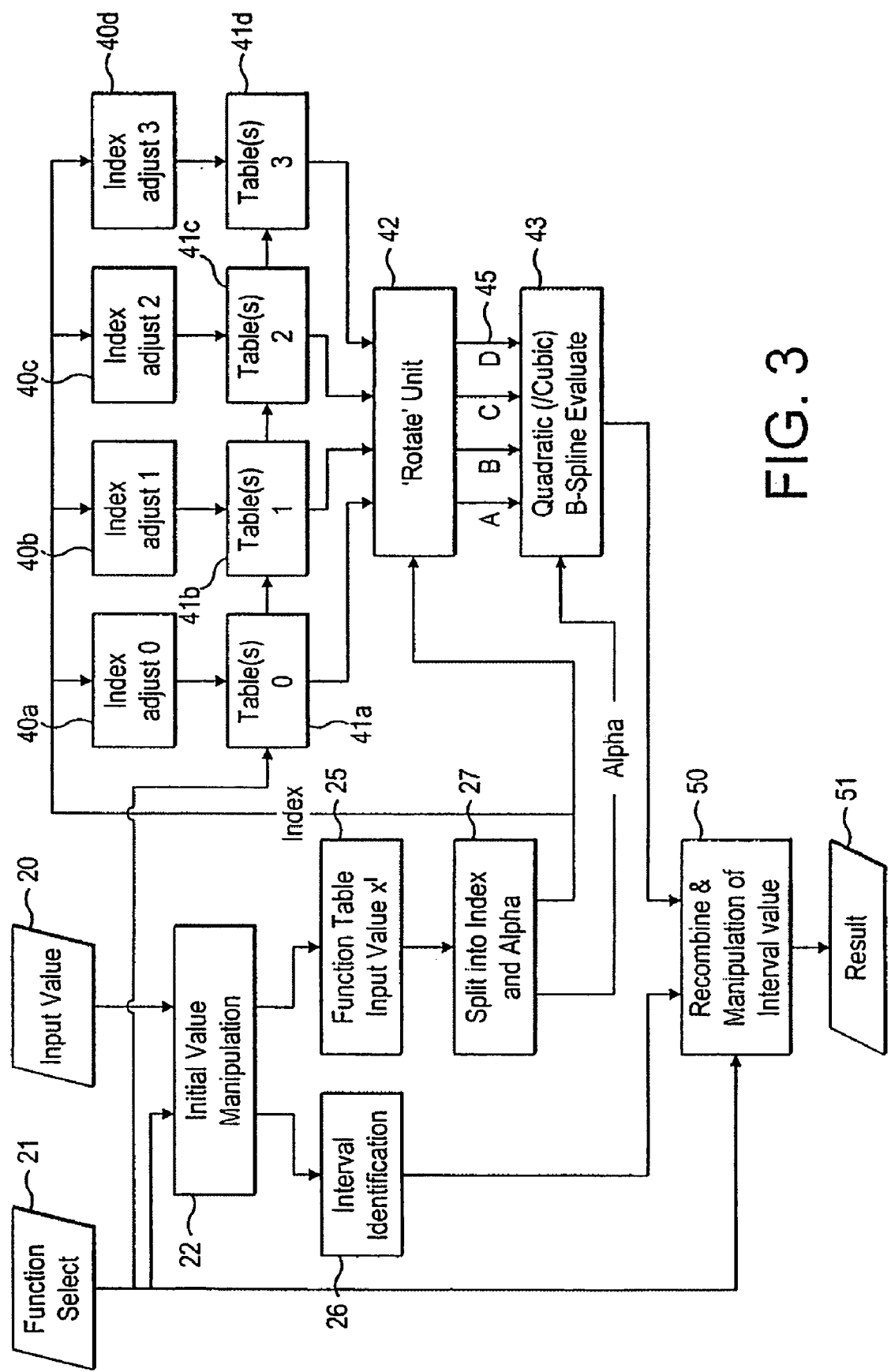
FIG. 3 shows an overview of a preferred embodiment of the invention for evaluating the functions using a piecewise quadratic (or optional cubic) approximation.

In a preferred embodiment, several basic functions are supported including reciprocal, reciprocal square root, logarithm base 2, and power base 2. Others skilled in the art will see that it is trivial to extend this set. An overview of the system will now be described with reference to FIG. 3.

Preferably, a floating-point value is input, '20', along with an identification of the required function to evaluate, '21'. The value is then manipulated, '22', to extract the interval over which the function is self-similar, and this provides an initial value x', '25', to define the position of the floating point within the self-similar interval and an encoding identifying the interval, '26'. This usually involves only simple bit manipulation of the floating point value and/or integer arithmetic on the floating point exponent. Descriptions of this type of process for 'reciprocal' and 'reciprocal square root' have been described in the aforementioned articles. In particular, for 'reciprocal', (for the purposes of brevity, ignoring special cases such as zero and exact powers of 2) the 8-bit exponent and the sign bit from the floating point number would identify the interval, and the more significant mantissa bits (ignoring the assumed leading '1') would form the x'value. The requirements for other functions should be apparent to one skilled in the art.

The x'value is then split, '26', into two components—an 'index' which defines how many sections he self-similar interval is broken up into and the relevant section for the x' value, the index is used to reference into the look-up tables, and an 'alpha' value in the range [0, 1) which represents the position of the x' value within the section and is used to evaluate the quadratic (or cubic) function. As described in the prior art, this is a trivial operation. Up to this point, the invention has not differed from typical prior art solutions.

The index value is now adjusted in four ways, '40a', '40b', '40c' and '40d', each according to which of the four look-up tables will be accessed. The calculations performed are as follows:

IndexOut=floor((IndexIn+3)/4);             40a

IndexOut=floor((IndexIn+2)/4)              40b

IndexOut=floor((IndexIn+1)/4)              40c

IndexOut=floor((IndexIn)/4)                40d

It should be clear, to one skilled in the art, that 'divide by 4' and 'floor' operations are merely trivial bit selection operations. The IndexOut values represent the locations in the lookup tables of the control points for the curve.

In the preferred embodiment, several different mathematical functions are implemented and so each of 'Table(s) 0', '41a', 'Table(s)1', '41b', 'Table(s)2', '41c', and 'Table(s)4', '41d', actually store several, possibly combined, look-up tables. The particular table in each set is selected by the function select value, '21'. The indices generated by '40a', '40b', '40c' and '40d', are also supplied to their respective tables, and the referenced values are output to the 'rotate' unit, '42'.

In the quadratic embodiment, Table(s)0 and Table(s)1 have $2^{N-2}+1$ entries per function and the other pair, $2^{N-2}$. (In a cubic embodiment, Table(s)2 would also have an extra entry per function). In the preferred embodiment, N would be 6, giving 64 sections in the function, but this value can be varied in alternative embodiments.

The control point values are then manipulated by the 'rotate' unit to generate the coefficients describing the polynomial which describes the function in the section. The 'rotate' unit takes the least significant pair of bits from the index and 'rotates' the supplied values from the tables as follows:

```
    In0 = Table0Result;
    In1 = Table1Result;
    In2 = Table2Result;
    In3 = Table3Result;
    //
    // If No rotation required...
    //
    If (Bottom2IndexBits == '00') THEN
        OutA = In0;
        OutB = In1;
        OutC = In2;
        OPTIONAL_OutD = In3; // Cubic only
```

```
    //
    // Else if rotate one place . . .
    //
    ELSEIF(Bottom2IndexBits == '01') THEN
        OutA = In1;
        OutB = In2;
        OutC = In3;
        OPTIONAL_OutD = In0; // Cubic only
    ELSEIF(Bottom2IndexBits == '10') THEN
        OutA = In2;
        OutB = In3;
        OutC = In0;
        OPTIONAL_OutD = In1; // Cubic only
    ELSE
        OutA = In3;
        OutB = In0;
        OutC = In1;
        OPTIONAL_OutD = In2; // Cubic only
    ENDIF
```

This functionality can be implemented in hardware using multiplexor units.

In the quadratic embodiment, in which the polynomial describing the function in the section is a quadratic, only 'A' through 'C' is supplied to the 'B-Spline Evaluate' unit, '43'. For the cubic embodiment, the D value, '45', is also generated and supplied.

The B-Spline evaluator unit, which will be described in more detail shortly, takes the 3 (or 4) supplied values, A, B, C (and optionally D), and the 'alpha' value generated by unit '27', and creates the interpolated result.

This output of '43' is supplied to unit '50' where the interval value is manipulated and combined with the interpolated function to produce the result, '51'. For the case of the reciprocal function, (again ignoring the special cases of 0 and exact powers of two) the IEEE 8-bit output exponent is set to be "127-Input_exponent-1", and the output of the B-Spline unit is used to form the mantissa.

Figure 4:
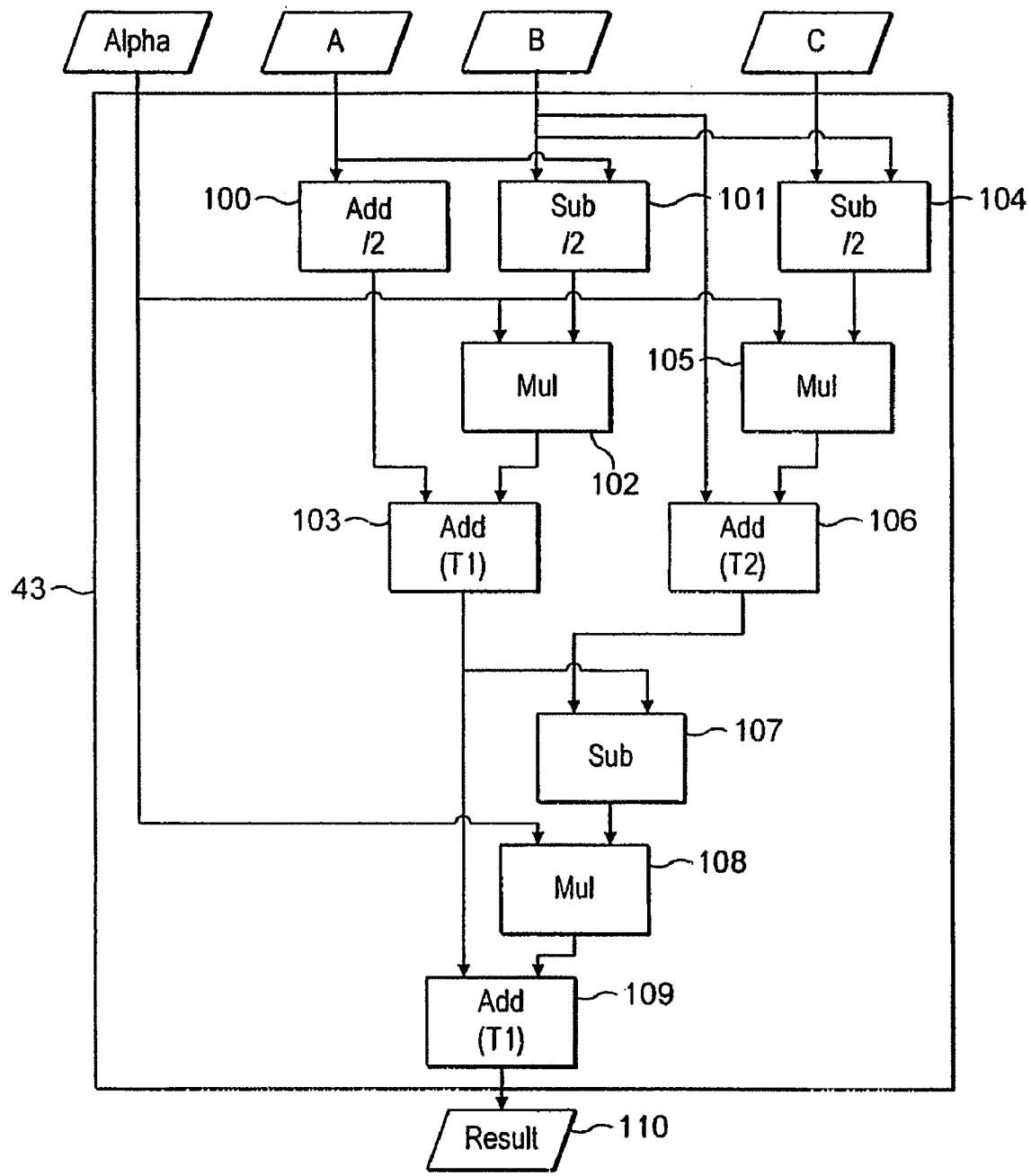
FIG. 4 shows the B-Spline evaluation unit.

The details of the quadratic embodiment of the B-Spline evaluation unit, 43, will now be described in more detail with reference to FIG. 4. This unit combines conversion from the B-Spline representation to Bezier representation with the de Casteljau evaluation known in the art. Mathematically, this combination can be summarised as:

$$T_1 = (A+B)/2 + \alpha(B-A)/2$$

$$T_2 = B + \alpha(C-B)/2$$

$$\text{Result} = T_1 + \alpha(T_2 - T_1)$$

In the preferred embodiment, these are achieved with an 'add and divide by 2' unit, 100, which sums inputs A and B. Since this is done with integer/fixed-point maths, the divide by 2 is, in effect, a 'no operation' as this is just a trivial 'renaming' of the bits. Similarly, the 'subtract and divide' unit, 101, computes (B−A)/2. This result is scaled, in unit 102, by the alpha value, (recall that $\alpha \in [0,1)$). Finally, in unit '103', the result of '102' is added to the result of '100' to produce intermediate value "$T_1$". Note that this value will lie between A and B.

Similarly, the intermediate value, "$T_2$", is produced as follows: Unit '104' subtracts B from C (and halves the result) and supplies it to unit '105' where it is scaled by alpha. This result is then summed with B in unit '106'.

The intermediate values, "$T_1$" and "$T_2$" are also linearly interpolated in a similar fashion: Unit 107 computes the difference of "$T_2$" and "$T_1$." which is then scaled by alpha in '108'. Finally this result is added to "$T_1$" in '109' to give the result, '110'.

In this description of the embodiment, the exact precision for each of the operators has not been specified, as this can be set according to the required input and output precisions of the overall functions that must be evaluated. Some descriptions of this process will be described shortly. Having said this, the de Casteljau method of evaluation is very mathematically stable and so the system is more tolerant of errors than the polynomial forms given in Equation 1 or 1a, in that the result will always remain inside the convex hull of the control points.

In a second preferred embodiment, a straightforward quadratic approximation is such as that given in equation 1, i.e.

$$f(x+\alpha)=C_0+C_1\alpha+C_2\alpha^2$$

The terms for these are very similar to those used in the de Casteljau embodiment, with $$C_0 = (A + B)/2$$
$$C_1 = (B - A)$$
$$C_2 = (C - B)/2 - (B - A)/2$$
$$= (C + A - 2B)/2$$

The advantage of this scheme is that there is a much shorter 'critical path' through the hardware.

In another embodiment, the multiplication units use truncated multipliers and squarers to reduce the cost of the system.

In another embodiment, a trivial simple linear term is removed from the initial function before evaluating the control point values. This trivial linear function is then re-applied after the linear evaluation to obtain the correct result. The linear function is chosen so that it adds only a negligible cost to the hardware (i.e. it requires no multiplier). The advantage of this is that it reduces the number of bits stored in the table by a significant margin. For example, the function chosen for reciprocal would be $f(x)=1-x$ and for "log" or sine (x), $f(x)=x$.

Determining the initial values for stored control points:

As stated, unlike the prior art techniques, the $2^N+K$ control point values that are stored in the tables generally do not lie on the curve of the function. Since it is important to be able to determine correct values for these points, three methods for computing these will be outlined.

The first method uses the standard numerical technique of Singular Value Decomposition, SVD, (e.g. see "Numerical Recipes in C". ISBN 0 521 43108 5) as a means of computing the best fitting control values. Assuming that in an embodiment, x' is J-bits, the function is evaluated at $2^H$ evenly spread positions, $N<H\leq J$. A vector containing these $2^H$ values is constructed. A matrix with $2^H$ rows and $2^N+K$ columns is also constructed wherein each row represents the weights that must be applied to each of the control points to evaluate the curve at the corresponding position. With a quadratic approximation, at most 3 items in the row will have non-zero values, all weights will be $\geq 0$ and the row will sum to exactly one.

The matrix is then 'pseudo' inverted using the SVD technique and multiplied by the vector to produce the $2^N+K$ control point values. The closer H is to J, the higher the accuracy of the final function, however, as SVD is an $O(N^3)$ algorithm, H should be chosen prudently. One advantage of this technique, though, is that once the pseudo inverse is computed by SVD, it can be used to compute the control points for several functions.

The second method uses the 'lifting' techniques of modern wavelet theory (see "Building Your Own Wavelets at Home". Sweldens and Schroder). This type of algorithm is O(N log N) and so is potentially much faster but may be slightly less accurate than the SVD approach though, in practice, this is likely to be insignificant. As with the SVD technique, a set of $2^H$(+additional region on either side) samples of the function are taken. For a quadratic system, these are gradually reduced to $2^N+2$ using the following procedure For each odd position, 2i+1, in the current sample set, compute:

Sample[2i+1]=(Sample[2i]+Sample[2i+2])/2−Sample[2i+1];

For each even position, 2i, in the current sample set, compute:

Sample[2i]=(Sample[2i−1]+Sample[2i+1])/4+Sample[2i];

Discard the odd sample values.

This is repeated until the required number of points remains. Note that either additional sample points on either side of the extremes are required OR the above must be adjusted to stop access outside of the range of sample values.

The third method is very simple and does not try to reduce the error for all the points in the range, yet still produces acceptable results for quadratic approximations. It relies on the fact that the middle point of a quadratic Bezier curve is given by ¼ A+½ B+¼ C. Since we know that A and C also lie on the curve, those values can also be computed, and so we can thus solve for the control point B, which is the value that is stored in the LUT for that segment.

Determining Precision of the Stored Values and Functional Units:

In a hardware embodiment, the size of the data in the stored tables and the width of the multipliers and adders/subtracts are critical to the cost of the system. These values can be 'tuned' to achieve the minimum cost for the required output accuracy. A very simple procedure is as follows: The width of the data stored in the lookup tables is, more or less, directly determined by the required accuracy of the output values, since these values are generally of the same magnitude as the output results and therefore must be of the same precision. This then approximately determines the input size of the adders and subtract units, 100, 101, and 104. Some savings can be made, however, by evaluating the maximum and minimum differences of the A, B, and C values, which can be used to reduce the size of the subtract units, 101 and 104, and subsequently, the multipliers, 102 and 105. The size of these multipliers depends on the choice for the precision of alpha, which in turn depends on the required accuracy of the overall functions. Some savings, however, can be made by discarding some of the LSBs from the multiplier outputs. The process is then repeated for the final linear interpolator formed by 107, 108, and 109. Alternatively, truncated multipliers can be used to reduce the cost.

Once initial guesses at the precision are obtained, an exhaustive test of all input values can be performed to test precision. If this passes, various precisions of the functional units can be reduced and the precision retested in order to find a cheaper implementation.

This scheme could also be used for implementing 'gamma correction' tables in computer graphics.

It will be clear to those skilled in the art that embodiments of the present invention reduce the memory required to store polynomial functions by storing control points from which the polynomial coefficients can be generated rather than by storing all the polynomial coefficients. Thus, only one control point is stored for each section of interval rather than the multiple coefficients which define the polynomial (3 for quadratic, 4 for cubic etc). The control points are manipulated to generate the polynomial coefficients. Additional advantages are provided since a complicated change in a curve can be produced by a small change in one control point. In contrast such a change in the curve would be represented by a completely different set of coefficients.

The present invention is directed to producing a reduction in memory requirements for a device using polynomial functions. The steps of manipulating the input function, determining intervals, index and alpha values as well as the polynomial evaluation are common to known systems. Thus any developments to these areas of systems can be combined with the memory saving facility of the present invention.

The invention claimed is:

1. A method for storing data representing a mathematical function in a memory device, the method comprising the steps of:
   receiving the mathematical function comprising a plurality of co-efficients with a receiver device;
   determining the mathematical function over a plurality of intervals with a determining device, each interval being approximated by a polynomial function;
   representing each polynomial function determined in the determining step by one spline control point per interval that defines a curve of the determined polynomial function with a representing device; and
   storing data representing the control point for the polynomial function for each interval in one of a plurality of lookup tables in the memory device,
   wherein the control points require less memory than the polynomial function.

2. The method according to claim 1, further comprising the step of storing the control points representing the function in the plurality of lookup tables, the number of the lookup tables being greater than or equal to the order of the function to be evaluated such that by accessing one control point from each table it is possible to retrieve simultaneously the full number of control points required to evaluate the function.

3. An apparatus for storing data representing a mathematical function in a memory comprising:
   a receiving unit for receiving the mathematical function comprising a plurality of co-efficients;
   a determining unit for determining the mathematical function over a plurality of intervals, each interval being approximated by a polynomial function;
   a representing unit for representing each polynomial function by one spline control point per interval that defines a curve of the determined polynomial function; and
   a storage unit for storing data representing the control point for the polynomial function for each interval in one of a plurality of lookup tables in the memory,
   wherein the control points require less memory than the polynomial function.

4. The apparatus according to claim 3, further comprising the plurality of lookup tables on which the control points representing the function are stored, the number of the lookup tables being greater than or equal to the order of the function to be evaluated such that by accessing one control point from each table, it is possible to retrieve simultaneously the full number of control points required to evaluate the function.

5. A method for storing data representing a mathematical function in a memory device, the method comprising the steps of:
   receiving the mathematical function comprising a plurality of co-efficients with a receiver device;
   determining the mathematical function over a plurality of intervals with a determining device, each interval being approximated by a polynomial function;
   representing each polynomial function determined in the determining step by one spline-type system control point per interval that defines a curve of the determined polynomial function with a representing device; and
   storing data representing the control point for the polynomial function for each interval in one of a plurality of lookup tables in the memory device,
   wherein the control points require less memory than the polynomial function, and the control points are B-spline control points.

6. A method for storing data representing a mathematical function in a memory device, the method comprising the steps of:
   receiving the mathematical function comprising a plurality of co-efficients with a receiver device;
   determining the mathematical function over a plurality of intervals with a determining device, each interval being approximated by a polynomial function;
   representing each polynomial function determined in the determining step by one spline-type system control point per interval that defines a curve of the determined polynomial function with a representing device; and
   storing data representing the control point for the polynomial function for each interval in one of a plurality of lookup tables in the memory device,
   wherein the control points require less memory than the polynomial function, and the control points are B-spline control points and further comprising the step of storing the control point representing the function for each interval in the plurality of lookup tables, the number of the lookup tables being greater than or equal to the order of the function to be evaluated such that by accessing one control point from each table, it is possible to retrieve simultaneously the full number of control points required to evaluate the function.

7. An apparatus for storing data representing a mathematical function in a memory comprising:
   a receiving unit for receiving the mathematical function comprising a plurality of co-efficients;
   a determining unit for determining the mathematical function over a plurality of intervals, each interval being approximated by a polynomial function;
   a representing unit for representing each polynomial function by one spline control point per interval that defines a curve of the determined polynomial function; and
   a storage unit for storing data representing the control point for the polynomial function per interval in one of a plurality of lookup tables in the memory,
   wherein the control points require less memory than the polynomial function, and the control points are B-spline control points.

8. An apparatus for storing data representing a mathematical function in a memory comprising:
   a receiving unit for receiving the mathematical function comprising a plurality of co-efficients;
   a determining unit for determining the mathematical function over a plurality of intervals, each interval being approximated by a polynomial function;
   a representing unit for representing each polynomial function by one spline control point per interval that defines a curve of the determined polynomial function; and a storage unit for storing data representing the control point for the polynomial function for each interval in one of a plurality of lookup tables in the memory, wherein the control points require less memory than the polynomial function, and the control points are B-spline control points and further comprising the plurality of lookup tables on which the control point representing the function for each interval are stored, the number of the lookup tables being greater than or equal to the order of the function to be evaluated such that by accessing one control point from each table it is possible to retrieve simultaneously the full number of control points required to evaluate the function.

\* \* \* \* \*